June 14, 1955     E. S. LOWRY ET AL     2,710,936
BATTERY HEAT MAINTAINER

Filed Nov. 3, 1952     2 Sheets-Sheet 1

INVENTORS
EMORY S. LOWRY
ARRON ANTON
JAMES B. GODSHALK

BY Stone, Boyden & Mack,
ATTY'S.

INVENTORS
EMORY S. LOWRY
ARRON ANTON
JAMES B. GODSHALK
BY Stone, Boyden & Mack
ATTYS.

United States Patent Office 2,710,936
Patented June 14, 1955

2,710,936

BATTERY HEAT MAINTAINER

Emory S. Lowry, Feasterville, Aaron Anton, Glenside, and James B. Godshalk, Philadelphia, Pa., assignors to Fox Products Company, Philadelphia, Pa., a corporation of Pennsylvania Application November 3, 1952, Serial No. 318,422

12 Claims. (Cl. 320—2)

This invention relates to battery heat maintainers and to direct current supply systems embodying the same.

In copending application Serial Number 318,423, filed November 3, 1952, by James B. Godshalk and Emory S. Lowry, there are described a method and apparatus whereby storage batteries and the like can be maintained at operable internal temperatures in especially cold environments by drawing direct current from the battery, converting that current to alternating current, and passing the alternating current through the battery to heat the same by reason of its internal resistance. The present invention provides an improved apparatus which may embody the principles disclosed in the aforesaid application, but which is also adaptable to situations wherein the alternating current for heating the battery is derived from an exterior source.

Battery systems of the type referred to include a D. C. circuit via which the batteries may be discharged, and an A. C. heating circuit. The D. C. circuit may simply constitute a supply for a converter employed to provide the A. C. heating current, or it may also constitute the load circuit via which steady or pulsating D. C. is supplied to the various electrical components (such as the starter motor, lights, etc.) of a military vehicle or the like. The D. C. circuit may also be employed to charge the batteries.

One object of the present invention is to provide such an apparatus wherein the batteries may be connected in both the D. C. circuit and the A. C. circuit at the same time without the A. C. source being shorted.

Another object is to provide such a system wherein an even number of batteries are connected in parallel aiding in a D. C. supply circuit and in series opposition in an A. C. heating circuit, and wherein means are provided for preventing the A. C. source from being shorted via portions of the D. C. circuit, such means being effective for this purpose without materially increasing the impedance in the D. C. circuit.

A further object is to provide such an apparatus useful either as a unitary battery heat maintainer or an operational D. C. supply system suitable for use in unusually cold environments.

In general, the present invention embodies an even number of batteries connected in parallel aiding in a supply circuit with an equal number of batteries in each parallel leg of the circuit, and with a choke coil in series with the batteries in each parallel leg, the coils being so arranged and connected as to be balanced so as to present effectively no inductance, or only a negligible inductance, when pulsating D. C. is drawn from the batteries to power a starter motor or some similar load device. A heating circuit is connected to supply an A. C. heating current to the batteries in series bucking, as by being connected across the junctions between the batteries and coils, with the choke coils effective to prevent the D. C. circuit from shorting the A. C. source. Since equal numbers of the batteries are connected back-to-back in the heating circuit, discharge of the batteries during heating is precluded.

In order that the invention may be understood in detail, reference is had to the accompanying drawings which form a part of this specification and wherein.

Figure 1:
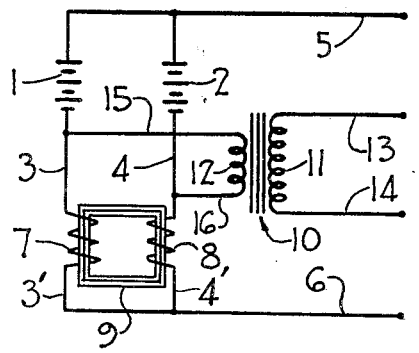
Fig. 1 is a circuit diagram illustrating a simple embodiment of the invention which employs an exterior source of heating current.

Referring now to the drawings in detail, and first to Fig. 1 thereof, it will be seen that the form of the invention there shown includes batteries 1 and 2 connected in parallel branch circuits 3 and 4, respectively, of a D. C. supply or discharge circuit including the conductors 5 and 6. In branch 3 there is connected in series with the battery 1 a choke coil 7, while a choke coil 8 is connected in the branch 4 in series with the battery 2. The coils 7 and 8 have substantially the same number of turns, are wound on a common core 9 of high magnetic permeability, and as shown in Fig. 1, are so connected in the branches 3 and 4 that the magnetomotive forces of the two coils resulting from direct current flow from the batteries 1 and 2 are substractive, cancelling each other. Since the coils 7 and 8 are substantially equal but are so connected in the parallel branches 3 and 4 that, for the flow of discharge current from the batteries to the load, the magnetomotive effects of the coils are opposed, the coils will be referred to for simplicity as balanced chokes. The batteries 1 and 2 are connected in parallel aiding relation in the supply circuit, as shown.

In this embodiment, the heating circuit includes a transformer 10 having a primary winding 11 and a secondary winding 12. The primary 11 may be connected to any suitable exterior source of A. C. via the conductors 13 and 14. The secondary 12 is connected by conductors 15 and 16 across the junctions between battery 1 and coil 7 and battery 2 and coil 8, respectively. While the magnetomotive forces of the balanced chokes 7 and 8 are opposed during the flow of discharge current from the batteries, the coils are differently oriented with respect to alternating current supplied from the transformer 10, since the alternating current must pass through the two branches 3 and 4 in series. If the circuit through the coils 7 and 8 for the alternating current from the transformer be traced in Fig. 1, it will be seen that the magnetomotive forces of the two coils are additive, resulting in maximum inductance, when the A. C. heating current flows.

When the heating circuit is energized, alternating current is supplied from the secondary 12 of the transformer 10 to the batteries 1 and 2 in series opposition. Since, as to the heating circuit, the batteries are connected back-to-back, and since the batteries will normally be of approximately equal voltage, there can be no material discharge from either battery through the heating circuit. Were the balanced chokes 7 and 8 not present, the A. C. source would be shorted via the lower portions 3' and 4' of the parallel branches 3 and 4, and no A. C. would pass through the batteries for heating purposes. But, since the coils 7 and 8 present maximum inductance in A. C. operation, such shorting is prevented. On the other hand, the balanced chokes 7 and 8 present a negligible inductance in the battery load circuit because for pulsating discharge currents flowing in the same direction in the parallel branches 3 and 4, as is the case when a starter motor or like load is connected across the conductor 5 and 6, the magnetomotive forces of the coils balance or cancel out, and the supply of current from the batteries through the conductors 5 and 6 is not substantially hindered. Accordingly, the batteries may be either charged or discharged via the supply circuit, and A. C. may be passed through the batteries via the heating circuit either to maintain the batteries at a desired internal temperature or to raise their internal temperature to a predetermined value.

Figure 2:
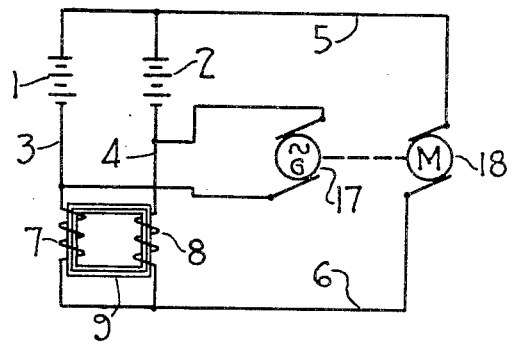
Fig. 2 is a circuit diagram for another embodiment of the invention wherein the heating current is derived from the batteries.

While the embodiment just discussed may employ an exterior A. C. source, that shown in Fig. 2 is adapted to derive its heating current from the batteries themselves. The batteries 1 and 2 and the balanced choked coils 7 and 8 are connected in the D. C. supply circuit in the same manner as in Fig. 1. But, in Fig. 2, the heating circuit comprises an A. C. generator 17 connected to supply its output to the batteries 1 and 2 in series opposition, as shown, the generator being driven by a D. C. motor 18 connected across the conductors 5 and 6. The operation of the apparatus of Fig. 2 is essentially the same as for that of Fig. 1, except that the alternating heating current is derived from the batteries via the motor and generator.

Figure 3:
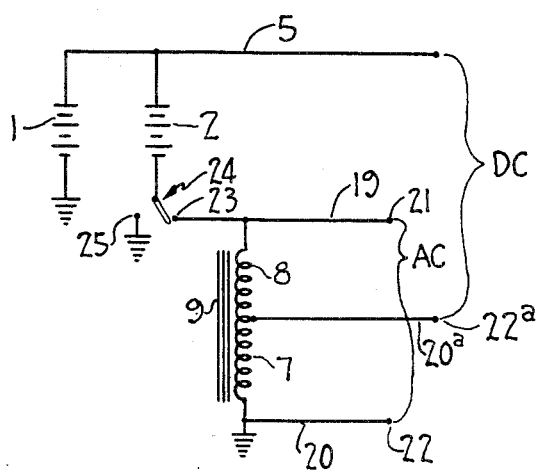
Fig. 3 is a circuit diagram showing a further embodiment adaptable to use in vehicles operated in unusually cold environments and employing an exterior source of heating current.

In some applications involving the battery systems of vehicles and the like, it is undesirable to install the balanced chokes directly in the existing D. C. circuit. In such systems, as illustrated in Fig. 3, the batteries 1 and 2 are connected in parallel aiding with one side of the batteries connected to the common conductor 5 and the other to ground. In combination in such a system, I prefer to employ a heating circuit comprising conductors 19 and 20 connected on the one hand to an exterior source of A. C. via terminals 21 and 22 and on the other hand to one contact 23 of a selector switch 24 and to ground, respectively. A second contact 25 of the selector switch 24 is connected to ground. The balanced choke coils 7 and 8 on the common core 9 are connected in series across the conductors 19 and 20, the junction between the two coils being connected via conductor 20ª to terminal 22ª.

When the selector switch is closed through contact 23, the D. C. supply circuit including conductor 5 and ground is broken, and the A. C. heating circuit is completed to supply heating current to the batteries in series opposition. But, when the selector switch is closed through contact 25, the heating circuit is broken and the batteries 1 and 2 connected in parallel aiding to supply D. C. to the various electrical components of the vehicle, or to receive a D. C. charging current. Thus, operation of the switch 24 selectively provides for use of the batteries as a source of D. C., or for operation of the A. C. circuit to heat the batteries. Further, D. C. may be drawn from the batteries during heating via a circuit comprising conductor 5, terminals 21ª and 22ª, conductor 20ª, and the balanced chokes 7 and 8. Thus, the batteries may be the source of power for heating, the input of a suitable D. C.-A. C. converter (not shown) being connected across terminals 21ª and 22ª, and the output of the converter being connected across terminals 21 and 22. In such case, the chokes 7 and 8 function in the manner previously explained to allow direct current flow via terminals 21ª and 22ª to the converter input, but to exclude alternating current from the input circuit to the converter.

Figure 4:
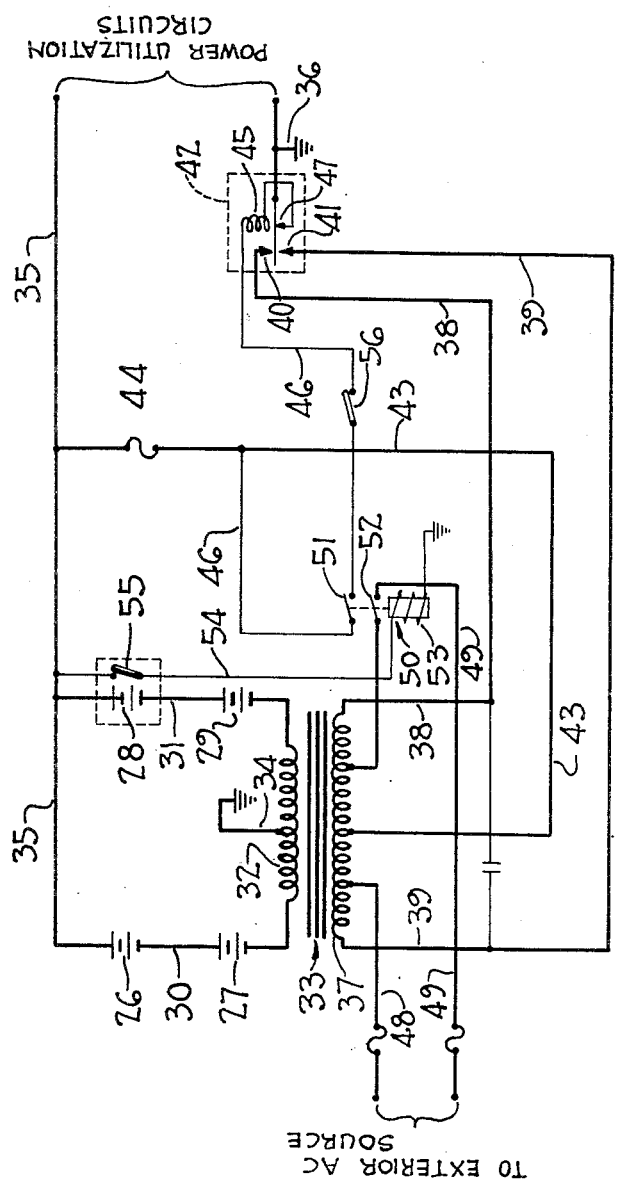
Fig. 4 is a circuit diagram illustrating yet another embodiment of the invention in which the heating current may be derived either from the batteries or an exterior source.

In Fig. 4, there is illustrated a preferred embodiment of the invention for use in military vehicles, such as tanks and the like, intended for operation in unusually cold environments, wherein the apparatus must function as a D. C. supply system including either means powered by the batteries themselves, or an exterior source of A. C., for maintaining the batteries at a desired operating temperature. In this embodiment, two pairs of batteries 26, 27 and 28, 29 are connected in parallel branches 30 and 31, respectively, with polarities aiding. Across these branches at one end of the parallel circuit is connected the secondary winding 32 of a transformer 33, the secondary being centertapped to ground at 34, so that the centertapped secondary constitutes two balanced chokes equivalent to the coils 7 and 8, Fig. 1. The opposite ends of the branches 30 and 31 are connected to a conductor 35 which, as indicated, connects to ground at 36 through the power utilizing circuits of the vehicle.

The transformer 33 includes a primary winding 37 the end terminals of which are connected to conductors 38 and 39, respectively, and thereby to the pull interrupter contact 40 and the inertia interrupter contact 41, respectively, of a vibrating reed type converter 42. The primary winding 37 is centertapped, and the centertap connected via conductor 43 to the conductor 35, preferably through a suitable fuse 44 to protect the vibrator circuit. The actuating coil 45 of the vibrator 42 is connected on the one hand to conductor 35 and the batteries 26—29 via conductors 46 and 43. On the other hand, the coil 45 is connected via contact 47 and the reed of the vibrator to ground at 36, so that the actuating coil will be energized from the batteries whenever conductor 46 is complete and contact 47 engages the reed of the vibrator. Thus the vibrator is connected to be powered from the batteries 26—29 and to supply A. C. to the two equal groups of batteries in series bucking via the transformer 33.

A portion of the primary winding 37 is also connected across an exterior A. C. supply circuit comprising conductors 48 and 49 so that, when desired, the vibrator 42 may be left idle and heating carried out by means of A. C. from any suitable exterior source via the conductors 48 and 49.

Thus, an A. C. heating current of a relatively high voltage may be provided from an exterior source for rapid heating or a relatively slower heating rate may be obtained, for maintaining the temperature of the batteries, via the vibrator. For example, in operation the conductors 48 and 49 may be connected to an exterior source of 110 volt, 60 cycle A. C. The vibrator, on the other hand, may be of a conventional type designed to supply approximately 45 volts at 100–115 cycles. Then, if the batteries 26—29 are 12 volt, 100 ampere-hour storage batteries, a fast heating rate on the order of 5° F. per minute may be attained with the apparatus when using the 110 volt exterior A. C. source. The 45 volt vibrator, on the other hand, operating from the batteries themselves, will provide a heating current sufficient to maintain the batteries at a substantially constant, operable temperature over periods as long as 24 hours, using only 50% of the battery power.

It is desirable that the vibrator circuit and the external heating circuit be interrupted whenever the batteries are at an operable internal temperature. Therefore, we provide a single control relay 50 having contacts 51 in the conductor 46 in series with the actuating coil 45 of the vibrator, and also having contacts 52 in the fast heating supply 48—49 in series with the transformer primary 37. The relay 50 includes an actuating winding 53 connected between the conductor 35 and ground by a conductor 54. In series with the actuating winding 53 of the relay, we provide a thermostatic switch 55 constructed for insertion into one of the batteries 26—29 so as to be subjected to the internal temperature of the battery. The thermostatic switch 55 is constructed to close at a given temperature, and to remain closed until the temperature exceeds that temperature. Thus, when the battery temperature falls below the minimum, the thermostat 55 acts to complete conductor 54 to energize winding 53 of relay 50, thus actuating contacts 51 and 52 to closed position, so that either the vibrator or the fast heating circuit may be operated. But, when the temperature of the batteries exceeds the minimum, the thermostat 55 opens, de-energizing the relay 50, so that heating current cannot be supplied to the battery.

It will thus be seen that, when the apparatus is left standing in an unusually cold environment, and the conductors 48 and 49 are not connected to any source of A. C., the vibrator 42 will operate to supply a heating current to the batteries automatically, through operation of the thermostat 55 and relay 50, during such periods as the batteries are below the predetermined minimum internal temperature. A suitable manual switch may be provided, as at 56, to deactivate the vibrator.

Where the term "battery" is used herein, that term is meant to include primary and secondary batteries or a single cell thereof. For simplicity, the invention has been referred to in some instances as including "a pair of batteries," but it will be understood that the invention may include any even number of batteries, as exemplified for example in Fig. 4. The term "balanced chokes" is employed to define two substantially equal coils wound upon a common core of high magnetic permeability and so connected in the parallel branches of the circuit as to produce opposite magnetomotive forces when discharge currents flow from the batteries in the parallel branches, such chokes being exemplified both by the centertapped windings of Figs. 3–4 and the simple common core chokes of Figs. 1–2.

We claim:

1. In combination in a device of the type described, a pair of batteries, first circuit means connecting said batteries in parallel aiding, a pair of balanced choke coils each connected in said first circuit means in series with a different one of said batteries, and second circuit means connected both across said batteries in series opposition and across the series combination of said choke coils.

2. In combination in a device of the type described, two batteries, means connecting said batteries in a parallel aiding circuit, a pair of equal choke coils connected one in series with each of said batteries in said parallel aiding circuit and wound upon a common core, said coils being so connected as to produce opposed magnetomotive forces as discharge currents are drawn from said batteries, circuit means for connecting a direct current load in series with said parallel circuit whereby said batteries each supply current to the load through one of said coils, and other circuit means connected across the junctions between said batteries and coils whereby alternating current may be supplied to said batteries in series opposition to heat the same with said coils producing like magnetomotive forces, and therefore maximum inductance, to prevent said other circuit means from being shorted via said parallel circuit.

3. In a battery heat maintainer, the combination of a pair of batteries, means connecting said batteries in a parallel aiding circuit, a pair of balanced choke coils each connected in series with one of said batteries in said parallel circuit, a D. C.-A. C. converter, a discharge circuit connecting the input of said converter in series with said parallel circuit, and circuit means connected to supply the output of said converter to said batteries in series opposition with the series combination of said balanced choke coils preventing short circuiting of said circuit means by said parallel circuit.

4. In combination in a battery heat maintainer, a pair of batteries; a discharge circuit, said batteries being connected to said discharge circuit in parallel aiding; a D. C.-A. C. converter, the input of said converter being connected to said discharge circuit to receive direct current from said batteries; a pair of choke coils wound upon a common core, each of said coils being so connected in series with one of said batteries as to produce during discharge of the batteries a magnetomotive force opposed to that of the other coil, and circuit means connecting the output of said converter across the junctions between said batteries and coils, whereby as to the output of said converter the batteries are in series opposition and the magnetomotive forces of said coils are additive.

5. In combination in an apparatus of the type described, two batteries, a D. C. load circuit, an A. C. supply circuit, a pair of series connected balanced choke coils connected across said supply circuit, means including a contactor for connecting said batteries either in parallel aiding to said load circuit or in series opposition across said supply circuit in parallel with said balanced choke coils, and a conductor connected to the junction between said choke coils to form with one side of said D. C. load circuit a second D. C. circuit via which current may be drawn from said batteries while the batteries are connected to said supply circuit.

6. In combination in an electrical supply system for use in unusually cold environments, two storage batteries, a supply circuit in which said batteries are connected in parallel aiding, a pair of balanced choke coils connected in said supply circuit one in series with each of said batteries, a D. C.-A. C. vibrator, circuit means connecting the input of said vibrator across said supply circuit, and other circuit means connecting the output of said vibrator to said batteries in series bucking with said choke coils preventing short circuiting of said other circuit means by said supply circuit.

7. In combination in an electrical supply system for use in unusually cold environments, two storage batteries, a supply circuit in which said batteries are connected in parallel aiding, a pair of balanced choke coils connected in said supply circuit one in series with each of said batteries, a D. C.-A. C. vibrator, an input circuit connecting the input of said vibrator across said supply circuit, a relay having contacts in said input circuit, a thermostat responsive to the internal temperature of one of said batteries, a control circuit connecting said thermostat and the actuating coil of said relay in series across said supply circuit, and an output circuit connecting the output of said vibrator to said batteries in series bucking with said choke coils preventing short circuiting of said output circuit by said supply circuit.

8. In an electrical supply system for use in unusually cold environments, the combination of a pair of storage batteries; a D. C. supply circuit in which said batteries are connected in parallel aiding, a pair of balanced choke coils connected one in series with each of said batteries; a D. C.-A. C. converter; an input circuit for said converter connected across said supply circuit to receive current from said batteries; two A. C. circuits connected to supply heating current to said batteries in series bucking with said choke coils preventing short circuiting of said output circuit by said supply circuit, the first of said A. C. circuits being connected to the output of said converter and the second being connectable to an exterior source of A. C.; a control relay having contacts in said input circuit and said second A. C. circuit; thermally actuated means responsive to the internal temperature of one of said batteries, and means connecting said thermally actuated means to control said relay.

9. In combination in a device of the type described, two batteries, discharge circuit means arranged to discharge said batteries in parallel aiding, a pair of balanced choke coils connected in said discharge circuit means each in series with a different one of said batteries during discharge thereof, and second circuit means constructed and arranged to supply current to said batteries in series bucking with said choke coils preventing short circuiting of said second circuit means by said discharge circuit means.

10. In a combination in a device of the type described, two batteries; a centertapped winding, the two halves thereof constituting balanced choke coils; a discharge circuit connecting said batteries in parallel aiding with each of said coils connected in series with a different one of said batteries, said discharge circuit including a conductor connected to the centertap of said winding; and a heating circuit constructed and arranged to supply alternating current to said batteries in series bucking with said balanced choke coils preventing said discharge cirsuit from shorting said heating circuit.

11. In combination in an electrical supply system for use in unusually cold environments, two storage batteries, a supply circuit in which said batteries are connected in parallel aiding, a pair of balanced choke coils connected in said supply circuit each in series with a different one of said batteries, a D. C.-A. C. converter, means for connecting the input of said converter across said supply circuit, and a pair of heating circuits constructed and arranged to supply alternating current to said batteries in series bucking with said choke coils preventing said supply circuit from short circuiting said heating circuits, one of said heating circuits being connected to the output of said converter and the other being connectable to an exterior A. C. source.

12. In combination in an apparatus of the type described, two batteries, discharge circuit means connecting said batteries in parallel aiding, a pair of balanced choke coils connected in said discharge circuit means each in series with a different one of said batteries, a D. C.-A. C. converter, means for connecting the input of said converter to said discharge circuit means to supply current from said batteries to said converter, and heating circuit means for supplying alternating current either from said converter or from an exterior source to said batteries in series bucking with said choke coils preventing said discharge circuit means from short circuiting said heating circuit means.

References Cited in the file of this patent

UNITED STATES PATENTS

| | | |
|---|---|---|
| 732,616 | Burgess et al. | June 30, 1903 |
| 982,493 | Hickley | Jan. 24, 1911 |
| 1,266,780 | Edison | May 21, 1918 |
| 1,363,889 | Linebarger | Dec. 28, 1920 |
| 2,354,877 | Peters | Aug. 1, 1944 |
| 2,442,380 | Schrodt et al. | June 1, 1948 |
| 2,498,814 | Little et al. | Feb. 28, 1950 |
| 2,516,048 | Endress | July 18, 1950 |